Dec. 5, 1944.　　　　Z. HOLLOS　　　　2,364,361
ARTILLERY TRACTOR
Filed June 1, 1942　　　　4 Sheets-Sheet 1
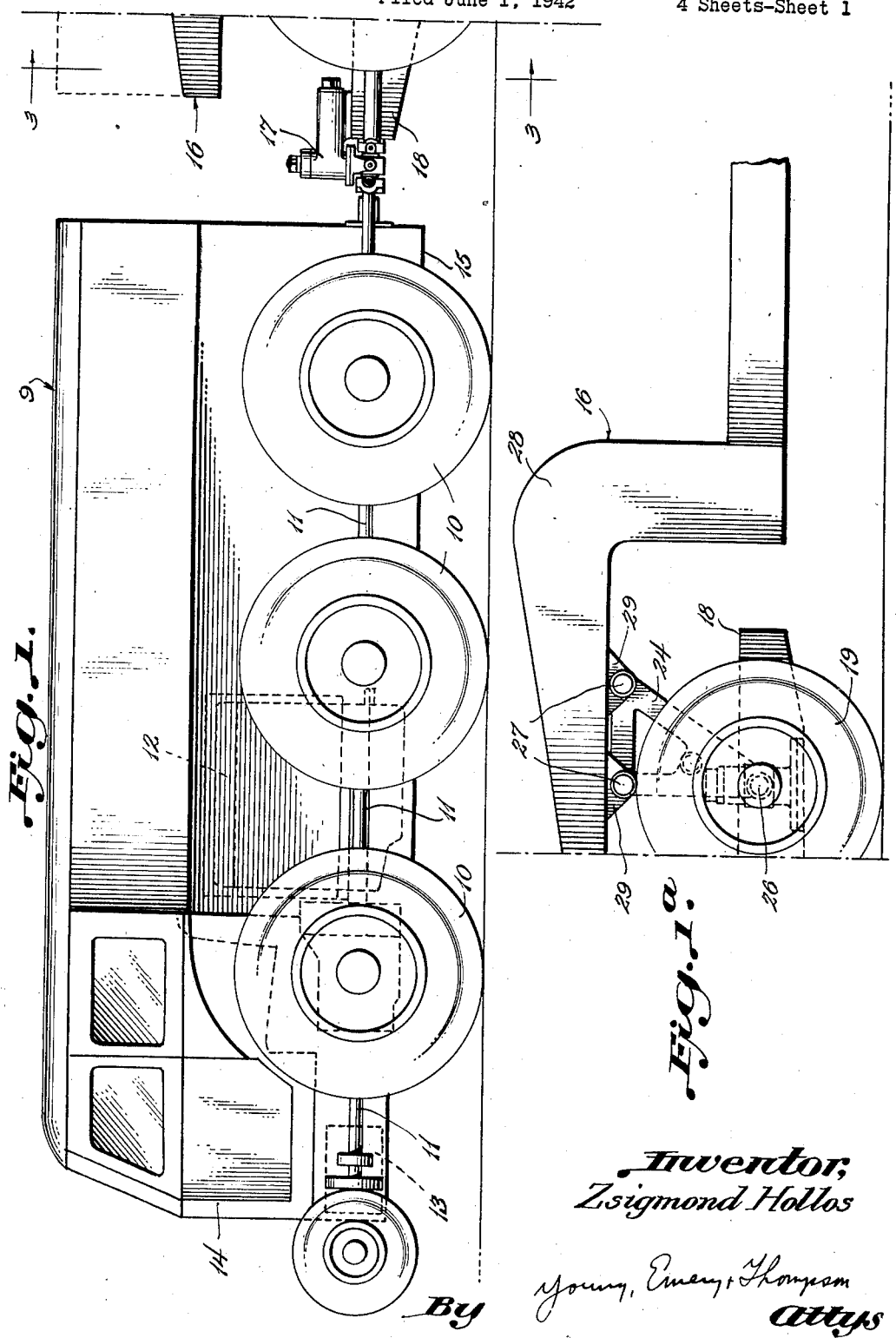
Inventor;
Zsigmond Hollos
By Young, Emery & Thompson
Attys Dec. 5, 1944. Z. HOLLOS 2,364,361
ARTILLERY TRACTOR
Filed June 1, 1942 4 Sheets-Sheet 2
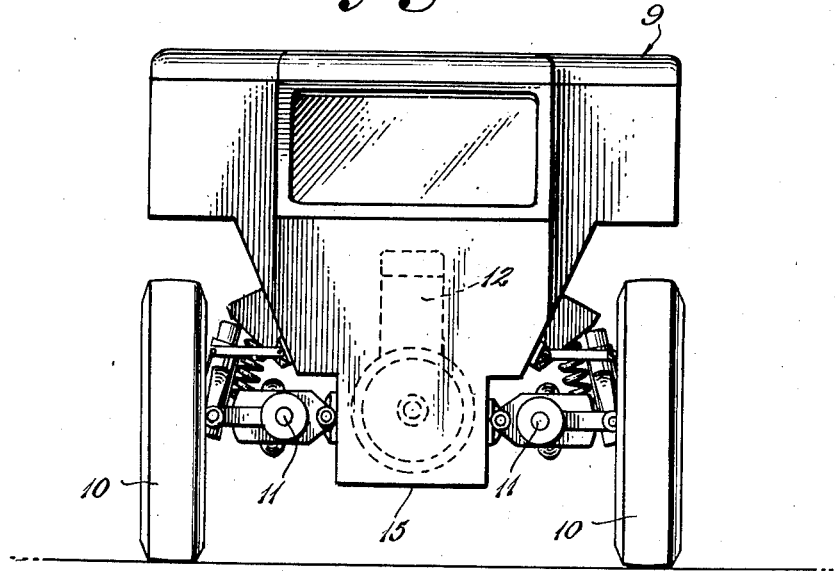
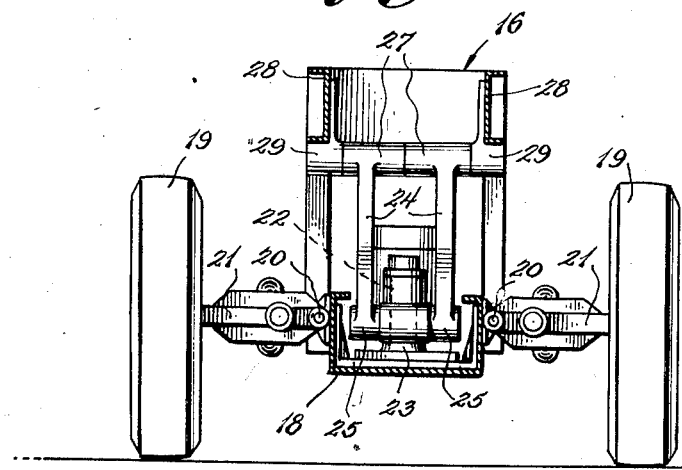
Inventor:
Zsigmond Hollos
By Young, Emery & Thompson
Attys.

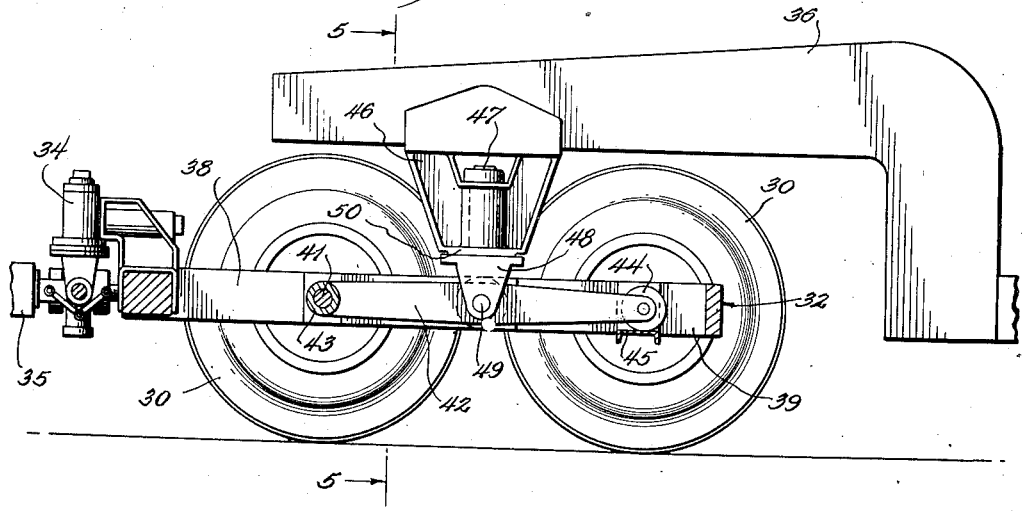
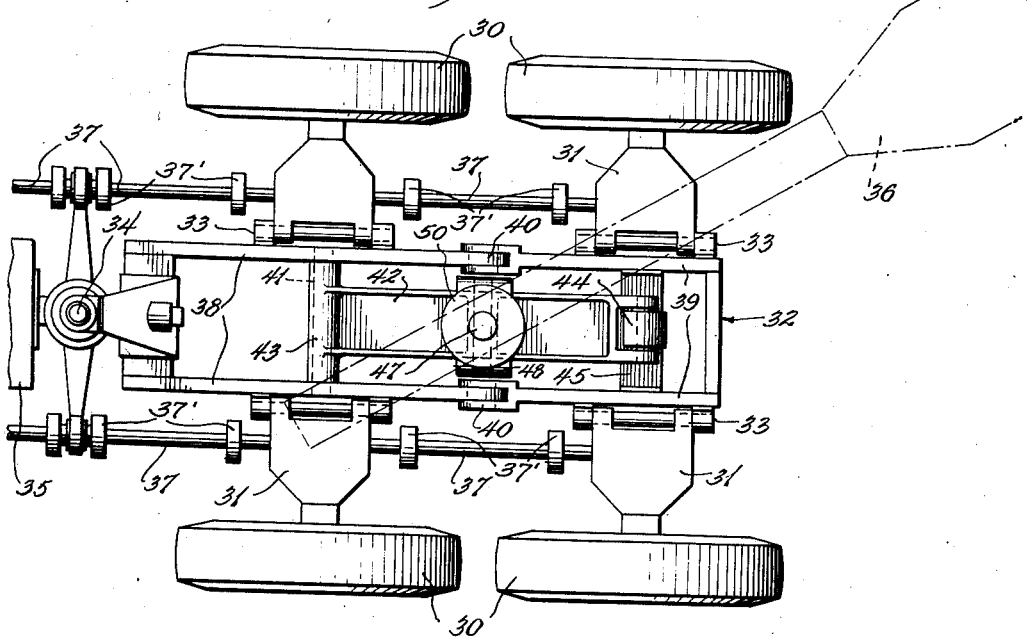

Dec. 5, 1944. Z. HOLLOS 2,364,361
ARTILLERY TRACTOR
Filed June 1, 1942 4 Sheets-Sheet 4

Inventor
Zsigmond Hollos
By Young, Emery & Thompson
Attorneys

Patented Dec. 5, 1944

2,364,361

UNITED STATES PATENT OFFICE 2,364,361

ARTILLERY TRACTOR

Zsigmond Hollós, New York, N. Y.

Application June 1, 1942, Serial No. 445,357

10 Claims. (Cl. 180—14)

The present invention relates to artillery tractors which may be used for military and commercial purposes.

It is an object of this invention to simplify the structure of artillery tractors and to provide a drive of some of the wheels of the trailer vehicle. A further object of the invention resides in a vehicle having a driven trailer which has a greater tractive ability and capacity not only on highways but also when traversing over hills and cross country. Another object of the invention resides in the construction of swinging axles and side driving shafts to the various driven wheels. By placing the drive shafts for the swinging half axles of the wheels at the sides it is possible to place the engine and floor of the tractor vehicle below the rotary axes of the wheels.

Further objects will be apparent from the following description, when considered in connection with the accompanying drawings, in which:

Figures 1 and 1a together show a side elevation of the tractor and trailer vehicles, Fig. 2 is a front elevation of the tractor vehicle, Fig. 3 is a vertical cross sectional view, taken on line 3—3 of Fig. 1, Fig. 4 is a longitudinal section of a modified trailer vehicle, Fig. 5 is a vertical section taken on line 5—5 of Fig. 4.

Fig. 6 is a plan view of the trailer vehicle,

Figure 5:
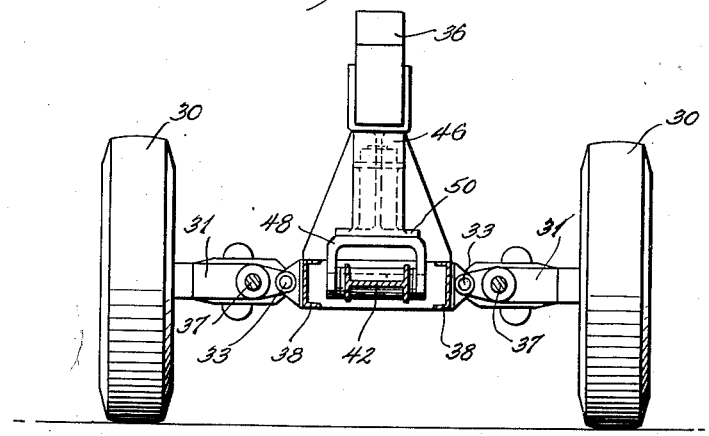

The tractor vehicle 9 is provided with a plurality of drive wheels 10 driven by a number of drive shafts 11. These shafts 11 are provided at each side of the vehicle 9 and are driven by an engine 12 through the transmission 13 at the front end 14 of the vehicle. It will be observed that the floor or bottom 15 of the vehicle is below the rotary axis of the wheels 10.

The trailer vehicle 16 is secured to the tractor vehicle 9 by means of a coupling 17 secured to an auxiliary frame 18, the latter being supported by two drive wheels 19 each pivoted to the frame 18 at 20 by swinging axles 21. The auxiliary frame 18 supports a pivot post 22 mounted on a support 23. A pair of links or brackets 24 are each pivoted at their lower end 25 on the support in the approximate line of the rotating axes 26 of the wheels 19. The upper ends of each bracket 24 are secured at two points 27 to the frame members 28 of the trailer vehicle 16 in the depending lugs 29. The swinging axles 21 are suitably supported by spring means not shown from the frame members 28.

The construction of Figs. 4 to 8 is similar to the structure of Figs. 1 to 3, except that there are four drive wheels for the trailer of Figs. 4 to 8 instead of two wheels. The drive wheels 30 are each mounted on swinging half or stub axles or housings 31 which are pivoted to the auxiliary frame 32 at 33. Each housing 31 has means for driving its drive wheel 30. The coupling 34 connects the tractor vehicle 35 to the auxiliary frame 32 of the trailer frame 36. The drive shafts 37 are driven by an engine (not shown) in the tractor vehicle 35 similar to the engine indicated in Figs. 1 to 3. In order to permit independent swinging of the stub axle housings 31 the shafts 37 are provided with flexible or telescoping couplings 37' which are of well known construction.

The auxiliary frame 32 is composed of two pairs of links 38 and 39 pivoted to each other at 40. The links 38 are provided with a cross pin or bearing rod 41 secured therein on which an I-shaped or central beam 42 is pivoted at one end by means of the bearing 43. The other end of the beam 42 is provided with a roller 44 bearing on and adapted to roll on a channel member 45 secured to the links 39.

A supporting bracket 46 for the trailer frame 36 is rotatably mounted on a pin 47, which latter is in turn pivotally mounted by a fork 48 to a cross pin 49 in the beam 42.

The bracket 46 actually contacts on and bears against a circular plate 50 which forms part of the fork 48.

Figure 7:
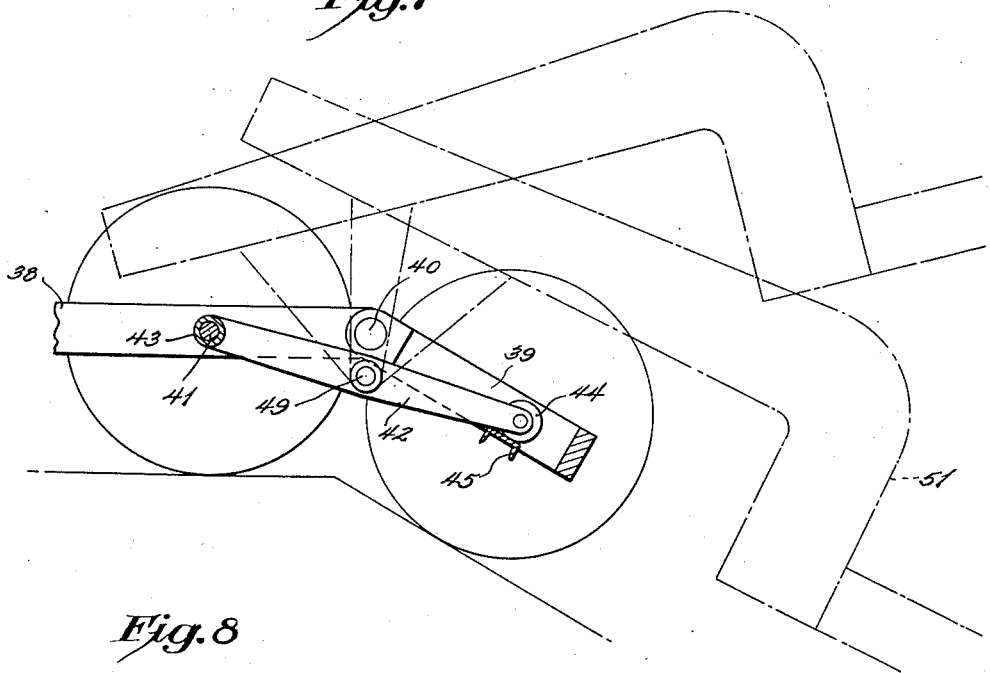
Fig. 7 is a diagrammatic view of the linkage of the trailer vehicle.
Figure 8:
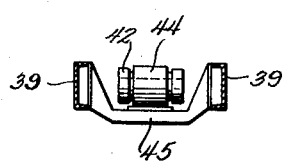
Fig. 8 is an end view of a detail.

Fig. 7 is similar to Fig. 4 in that Fig. 7 shows how the trailer frame 51 may assume two extreme positions on up and down hill terrain. The parts 38, 39, 40, 41, 42, 43, 44, 45 and 49 are actually shown as the trailer wheels pass over the top of an incline with the frame 51 in the bottom position.

It is believed that the operation of the invention will be perfectly clear from the foregoing description when considered in connection with the drawings. The specific coupling and drive means, as well as the spring suspension for the stub axles, form the subject matter of my copending applications, Serial No. 417,720, filed November 3, 1941, and Serial No. 437,079, filed March 31, 1942. The relationship of the drive shafts and the swingingly mounted wheels is shown in my Patent No. 1,920,175, dated August 1, 1933.

The structure of this invention has many useful advantages, of which may be mentioned the straight and rigid frame without any curves or curved parts, and permits the lowest position of the frame between half axles. There is also much useful space between the longitudinal beams of the frame and the floor of the vehicles are below the rotary axes of the wheels. The engine and transmission are also low in the frame, which thus makes it possible to lower the center of gravity of the vehicle as well as to decrease the overall height of the vehicle as compared with vehicles now in use. It is also possible to obtain easy access to all of the parts of the transmission and even if such parts need attention or repair they can be easily dismantled and reassembled. The body of the vehicle has the highest stability and is safe even when the vehicle must traverse over uneven or cross country, which is necessary for military vehicles.

The driven wheels on the trailer vehicle results in a greater tractive ability, not only on regular highways but also in traversing uneven terrain.

I claim as my invention:

1. A vehicle of the trailer type comprising an auxiliary frame, a plurality of stub axle housings pivotally secured to the frame and each having means for driving corresponding drive wheels, a central beam pivotally mounted at one end on the auxiliary frame, and a trailer frame having one end rotatably and pivotally secured to the central beam.

2. A vehicle of the trailer type comprising an auxiliary frame in the form of a rectangle with two opposite sides each side formed by two links pivoted to each other, a plurality of stub axle housings pivotally secured to the frame and each having means for driving a drive wheel for the trailer, a central beam pivotally mounted at one end between two opposite links of each pair of links and having a roller at the other end, a member mounted between the other and opposite links of each pair on which the roller is adapted to abut, and a trailer frame having one end rotatably and pivotally secured to the central beam, said links being movable around their common pivot points and the roller rolling on its supporting and abutting member during movement of the links when the trailer traverses uneven ground.

3. A vehicle of the trailer type comprising an auxiliary frame in the form of a rectangle with two opposite sides each side formed by two links pivoted to each other, a plurality of stub axle housings pivotally secured to the frame and each having means for driving a drive wheel for the trailer, a cross pin mounted in and between two opposite links of each pair of links, a central beam rotatably mounted on the cross pin at one end having a roller at the other end, a member mounted between the other and opposite inks of each pair on which the roller is adapted to abut, and a trailer frame having one end rotatably and pivotally secured to the central beam, said links being movable around their common pivot points and the roller rolling on its supporting and abutting member during movement of the links when the trailer traverses uneven ground.

4. A vehicle according to claim 3, in which drive shafts are provided along the sides of the rectangular frame for driving the drive means of the housings.

5. In an auxiliary frame for a vehicle, a wheel and load supporting structure comprising a pair of links, of which each pair is composed of two members pivotally connected to each other at one of their ends, means for connecting the other ends of the members to each other to form with the links a rectangular frame, a central beam pivotally connected at one end between two opposite members of the pair of links and having an abutting member at the other end, and means mounted between the other two opposite members of the pair of links on which the abutting member contacts.

6. A truck unit for a vehicle comprising a frame including two pairs of links of which each pair is pivoted together and the pairs are spaced from each other, a stub axle pivoted to each link, a bearing rod secured to two opposite links of each pair of links, a cross member connected to the other two links of each pair, and a central beam pivoted at one end on the rod and bearing at the other end on the cross member with a sliding action when the links of the pairs move relative to each other, the central beam being provided in the space between the pairs of links and the weight of the vehicle resting on the central beam at a central point thereof.

7. A truck unit according to claim 6, in which a roller is provided rotatably mounted on the end of the central beam which contacts on the cross member.

8. A truck unit for a vehicle comprising a frame including two pairs of links of which each pair is pivoted together and the pairs are spaced from each other, a wheel for each link, a bearing rod secured to two opposite links of each pair of links, a cross member connected to the other two links of each pair, and a central beam pivoted at one end on the rod and bearing at the other end on the cross member with a sliding action when the links of the pairs move relative to each other, the central beam being provided in the space between the pairs of links and the weight of the vehicle resting on the central beam at a central point thereof.

9. A vehicle of the trailer type comprising an auxiliary frame, a plurality of stub axle housings pivotally secured to the frame and each having means for driving corresponding drive wheels, a central beam pivotally mounted at one end on the auxiliary frame, a trailer frame having one end rotatably and pivotally secured to the central beam, and means on the other end of the central beam to support said other end of the beam with a sliding action on the auxiliary frame.

10. A vehicle of the trailer type comprising an auxiliary frame, a plurality of stub axle housings pivotally secured to the frame and each having means for driving corresponding wheels, a central beam pivotally mounted at one end on the auxiliary frame, a trailer frame having one end rotatably and pivotally secured to the central beam, and a roller on the other end of the central beam to support said other end of the beam with a sliding action on the auxiliary frame.

ZSIGMOND HOLLÓS.